US012770419B2

(12) United States Patent
Jayaraman

(10) Patent No.: US 12,770,419 B2
(45) Date of Patent: Oct. 20, 2026

(54) AUTOMATED REMOTE VERIFICATION OF A DOCUMENT

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 584 days.

(21) Appl. No.: 18/174,899

(22) Filed: Feb. 27, 2023

(65) Prior Publication Data

US 2024/0290120 A1 Aug. 29, 2024

(51) Int. Cl.

| | |
|---|---|
| ***G06V 20/00*** | (2022.01) |
| ***G06V 30/18*** | (2022.01) |
| ***G06V 30/19*** | (2022.01) |
| ***G06V 30/41*** | (2022.01) |

(52) U.S. Cl.

CPC .............. *G06V 20/95* (2022.01); *G06V 30/18* (2022.01); *G06V 30/19007* (2022.01); *G06V 30/41* (2022.01)

(58) Field of Classification Search

CPC .. G06V 20/95; G06V 30/18; G06V 30/19007; G06V 30/41

See application file for complete search history.

(56) References Cited

U.S. PATENT DOCUMENTS 11,051,163 B1 * 6/2021 Smith ................... H04W 12/06
2003/0046351 A1 * 3/2003 Maruyama ............. G06Q 10/10 709/206
2004/0021550 A1 * 2/2004 Ohtaki ............... G07C 9/00309 340/5.31
2005/0281449 A1 * 12/2005 Takiguchi ............. G06F 18/256 382/139
2015/0324524 A1 * 11/2015 Hosoda .................. G16H 10/60 705/3
2015/0331897 A1 * 11/2015 Zhou ................... G06F 16/2365 707/692
2019/0052467 A1 * 2/2019 Bettger ................. H04L 9/0643
2020/0104192 A1 * 4/2020 Siddhartha ............ H04L 9/3228
2020/0167106 A1 * 5/2020 Kim ................... G06Q 30/0236
2020/0220733 A1 * 7/2020 Schmidt .............. H04W 12/069
2020/0380501 A1 * 12/2020 Ramanathan ........ G06Q 20/322
2023/0096705 A1 * 3/2023 Utoh ................... G06F 15/0225 707/608

(Continued)

*Primary Examiner* — Akwasi M Sarpong
*Assistant Examiner* — Michael L Burleson
(74) *Attorney, Agent, or Firm* — Michael A. Springs, Esq.; Shumaker, Loop & Kendrick, LLP; Patrick B. Horne

(57) ABSTRACT

A computing system and a method of remotely verifying documents use a document verification code present on the documents. A user establishes communication with the computing system from a user computing device and is instructed to enter the document verification code displayed on a document to be verified. Depending on the code format, the user can enter the code on a keyboard or by capturing an image with a camera of the user computing device. The computing system receives and compares the received code to a plurality of verification codes stored in a storage device and transmits a message to the user device indicating that the document is valid when the received code matches one of the verification codes stored in the storage device or that the document is not valid when the received code does not match any of the verification codes stored in the storage device.

16 Claims, 3 Drawing Sheets

(56) References Cited

U.S. PATENT DOCUMENTS

| | | | | |
|---|---|---|---|---|
| 2023/0325839 | A1 * | 10/2023 | Osborn ................ | G06Q 20/042<br>705/44 |
| 2023/0362013 | A1 * | 11/2023 | Osborn ................. | H04L 9/3242 |

* cited by examiner

AUTOMATED REMOTE VERIFICATION OF A DOCUMENT

FIELD

This invention relates generally to the field of document verification, and more particularly embodiments of the invention relate to verifying documents incorporating verification codes using an automated remote computing system executing a document verification method.

BACKGROUND

Fake and altered documents are becoming more difficult to detect as the hardware, software and techniques for document generation have increased the quality of non-professionally produced documents. Regular checks and cashier's checks are frequently used to purchase goods and services. Cashier's checks are popular as they have a reputation for being safe because they are guaranteed by the issuing bank. However, a person in possession of a cashier's check, or a copy of the check, cannot verify that the check is valid without visiting or calling the bank that issued the check. That might not be possible prior to having to decide whether to accept the check. Therefore, it is desirable to have a method to remotely verify a document such as a cashier's check.

BRIEF SUMMARY

Embodiments of the present invention address the above needs and/or achieve other advantages by providing apparatuses and methods that enable a user to remotely and automatically verify whether a document is valid.

Embodiments of the invention include a computing system for remotely verifying a document, the computing system comprising: a storage device storing a plurality of unique verification codes, each of the verification codes corresponding to a different document; a communication interface; a processor operatively coupled with the storage device and the communication interface, the processor adapted to be operatively coupled over a communication channel with a user device by the communication interface; and an application stored in the storage device and including executable code. When the application is executed, it causes the processor to: send a prompt to the user device causing the user device to display a user instruction regarding initiating a verification of a document accessible to the user, the document displaying a document verification code; wherein the user responds to the user instruction by inputting the document verification code from the user device in coordination with a downloaded application stored on the user device, the user device then transmitting the document verification code as code information to the processor via the communication channel; receive the code information from the user device and compare the received document verification code to the verification codes stored in the storage device; and transmit to the user device via the communication channel a message indicating that the document is valid when the received document verification code matches one of the verification codes stored in the storage device or indicating that the document is not valid when the received document verification code does not match any of the verification codes stored in the storage device.

According to one aspect of the invention, the user responds to the user instruction by capturing, by a camera of the user device in coordination with a downloaded application stored on the user device, an electronic image of the document including the document verification code, the user device then transmitting the electronic image to the processor via the communication channel as the code information, the processor receiving the electronic image, extracting the document verification code from the electronic image and comparing the extracted document verification code to the verification codes stored in the storage device.

According to another aspect of the invention, the document is a cashier's check. The cashier's check has a magnetic ink character recognition line and the document verification code is positioned adjacent a right end of the line. The document verification code can be formed in a same font as numbers in the magnetic ink character recognition line. The document verification code can be at least one of a number, an alphanumeric phrase, a bar code, a QR code, and a holographic image.

The storage device stores data associated with each of the unique verification codes. The stored data can include an image of the associated issued document. When the issued document is a cashier's check, the data includes information displayed on a front side of each of the cashier's checks.

According to a further aspect of the invention, the computing system processor transmits the message indicating that the document is not valid when the document verification code matches one of the verification codes stored in the storage device and the document is no longer valid.

Another embodiment of the invention relates to a method of remotely verifying a document, the method comprising steps of: displaying, by a user-interface of a user device, a prompt, wherein the prompt provides user instruction regarding initiating a verification of a document displaying a document verification code; responding to the user instruction by entering the document verification code in the user device and/or by capturing, by a camera of the user device in coordination with a downloaded application stored on the user device, an electronic image of the document verification code on the document, wherein the downloaded application comprises computer-executable code that, when executed by a processor of the user device, provides the user-interface and responds to the entered document verification code and/or the electronic image to generate code information corresponding to the document verification code; transmitting the code information to a computing system by operation of the user-interface and a communication circuitry of the user device; receiving the code information by the computing system, the computing system extracting the document verification code from the code information and comparing the document verification code to a plurality of verification codes stored in a storage device; and the computing system transmitting a message to the user device indicating that the document is valid when the extracted document verification code matches one of the verification codes stored in the storage device or indicating that the document is not valid when the extracted document verification code does not match any of the verification codes stored in the storage device.

The method can include creating and issuing the document and storing the document verification code in the storage device as one of the verification codes. The document verification code can be at least one of a number, an alphanumeric phrase, a bar code, a QR code, and a holographic image.

When the document is a cashier's check, the method can include updating data in the storage device to indicate that the cashier's check is not valid when the cashier's check has been processed for payment. The method can include transmitting the message that the document is not valid when the extracted document verification code matches one of the verification codes stored in the storage device and the associated issued document is no longer valid.

In another embodiment of the invention, a method of remotely verifying a document comprises steps of: placing a unique document verification code on a document; storing the unique document verification code in a storage device; receiving a document verification code from a user device; comparing the received document verification code with the unique document verification code stored in the storage device; and transmitting a message to the user device indicating that the received document verification code is associated with a valid document when the received document verification code matches the unique document verification code stored in the storage device or indicating that the document is not valid when the received document verification code does not match the unique document verification codes stored in the storage device.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
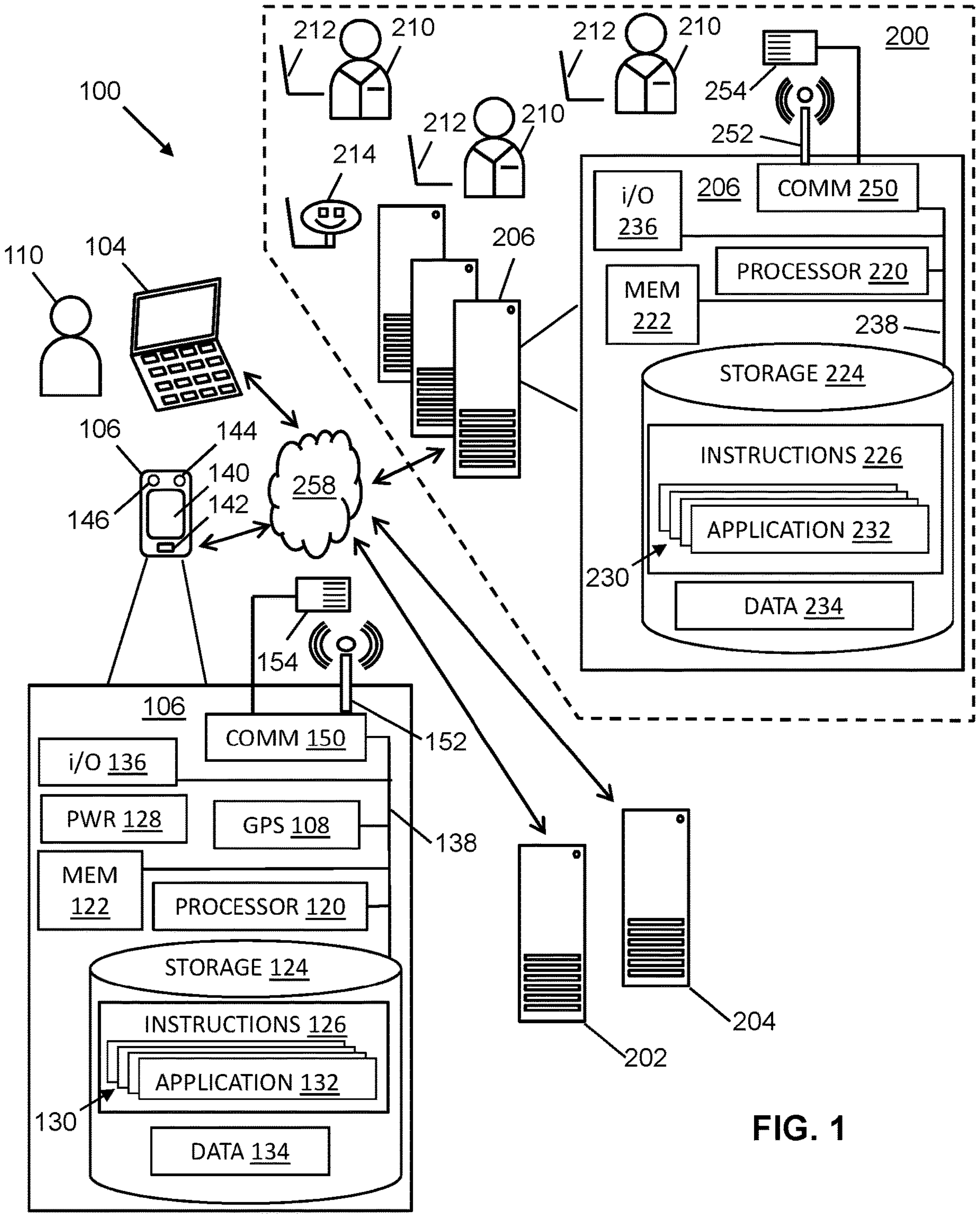

Having thus described embodiments of the invention in general terms, reference will now be made to the accompanying drawings, wherein:

FIG. 1 illustrates an enterprise system, and environment thereof, according to at least one embodiment.

Figure 2:
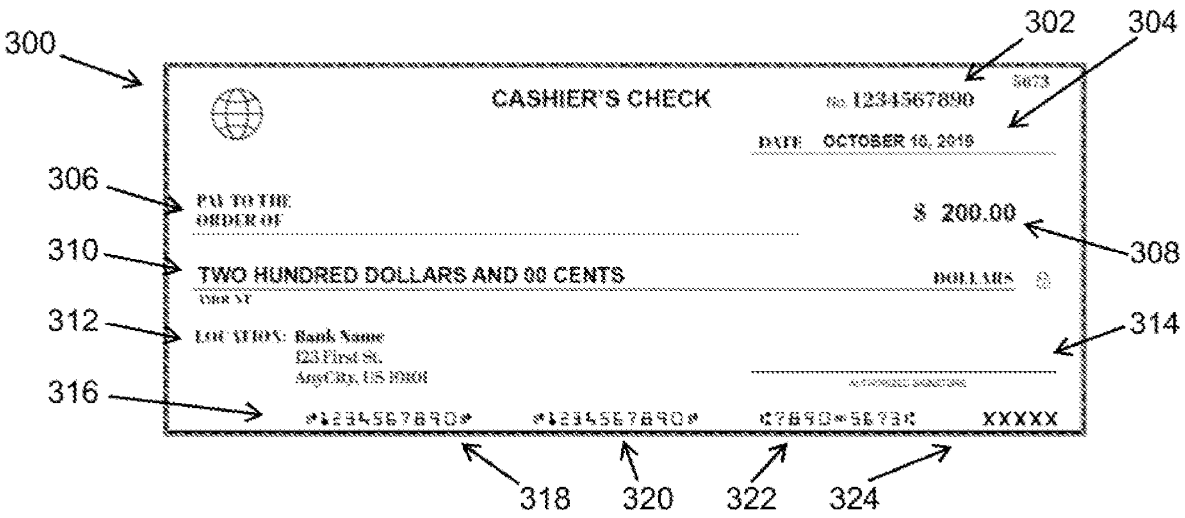

FIG. 2 is a front side view of a document having a verification code according to at least one embodiment of the invention.

Figure 3:
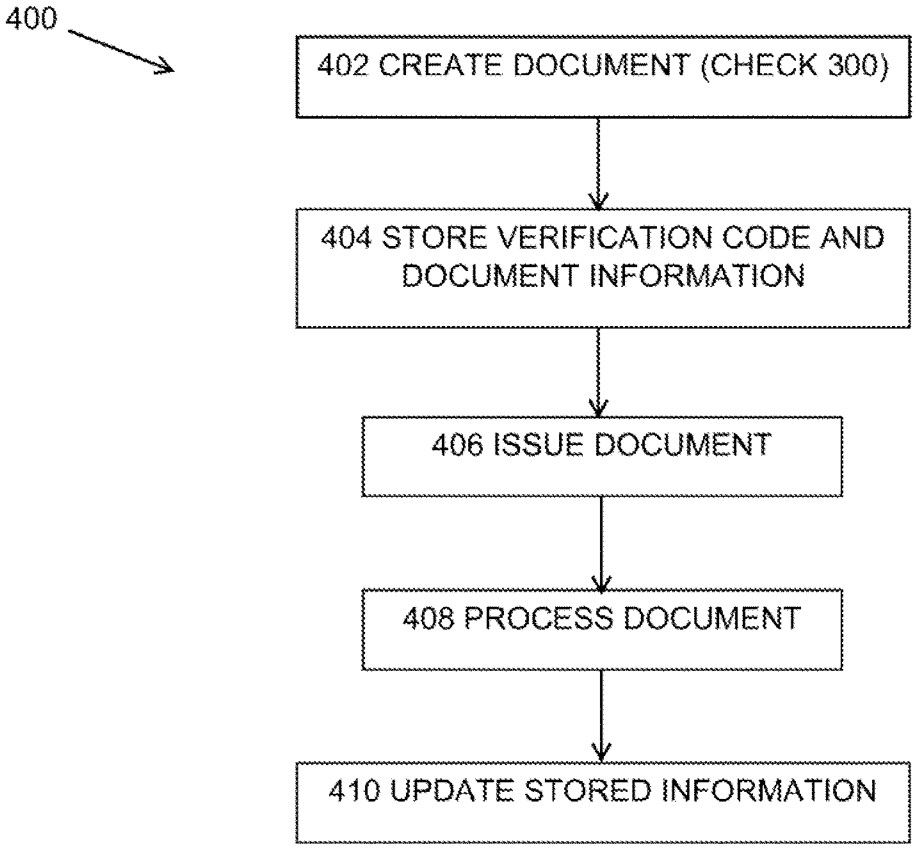

FIG. 3 is a flow diagram representing a method, according to at least one embodiment, of creating and issuing the document of FIG. 2 and storing the verification code.

Figure 4:
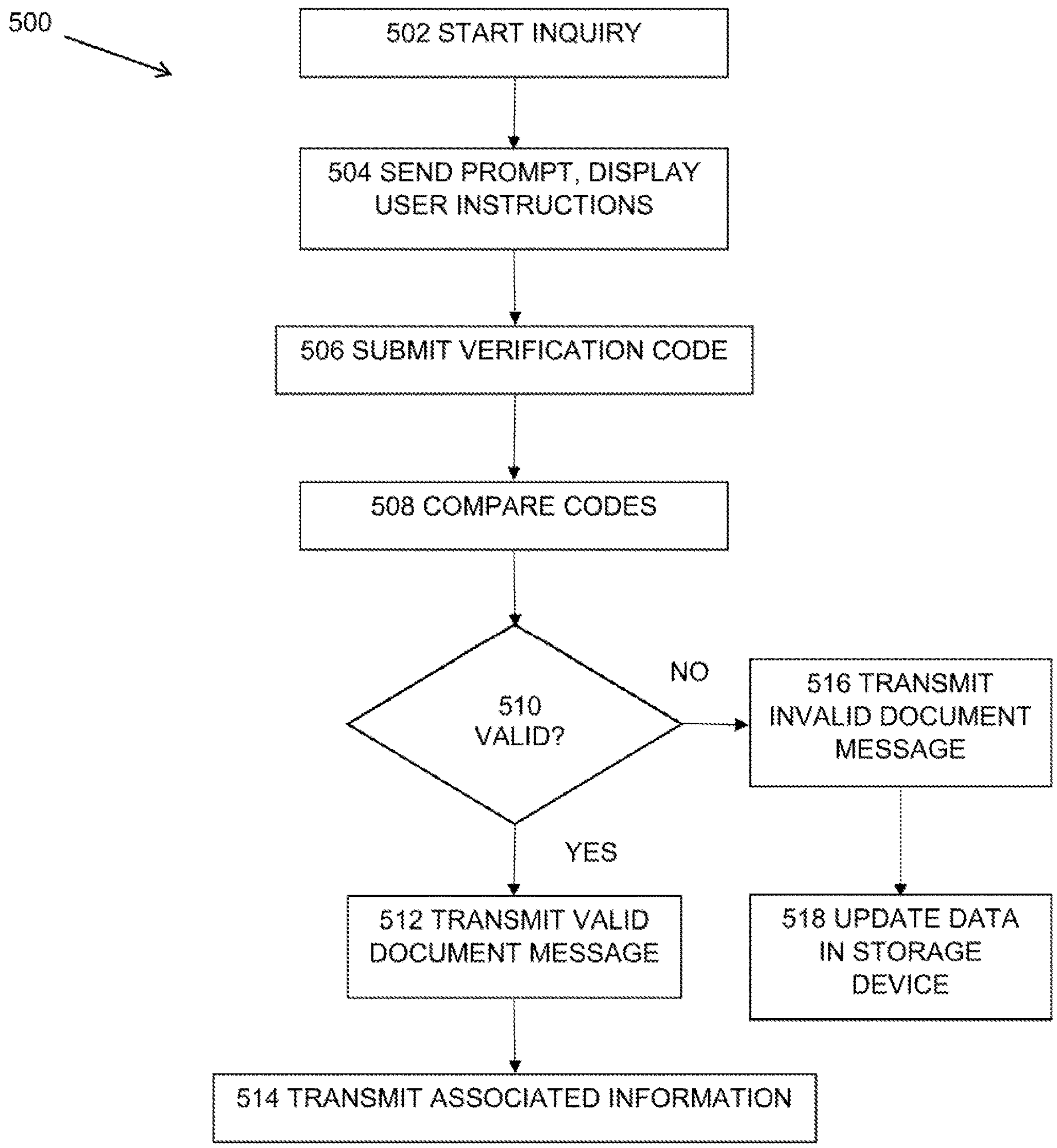

FIG. 4 is a flow diagram representing a method, according to at least one embodiment, of verifying the document of FIG. 2.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

There are circumstances wherein a person or a business desires to verify that a document is valid before making a decision related to the document. For example, currently there is no way to verify whether a document is a valid cashier's check or not. Embodiments of the present invention enable an automated remote verification of documents.

FIG. 2 is a front side view of a typical cashier's check 300. Information printed on the check 300 includes: a check number 302; a date 304; a payee line 306; an amount in numerals 308; an amount in words 310 corresponding to the amount 308; payer identification 312; an authorized signature line 314; and a magnetic ink character recognition (MICR) line 316. The MICR line 316 includes a bank routing number 318, a payer account number 320 and a check number 322 related to the check number 302.

A person in possession of the cashier's check 300, or a copy of the check, cannot verify that the check is valid without visiting or calling the bank that issued the check. However, it may not be possible visit or call the bank prior to having to decide whether to accept the check. The invention provides a system and a method for remotely verifying the validity of a cashier's check, or any other document, using a verification code added to the check.

As shown in FIG. 2, the cashier's check 300 has a unique document verification code 324 added on the front side. Although the verification code 324 can be positioned in any available space on the front side, an advantageous location is at the right end of the MICR line 316. If the verification code 324 is a number, e.g. a five digit number, it can be printed in the same font as the other numbers in the line 316. Other types of verification codes include an alphanumeric phrase, a bar code, a QR code, and a holographic image. Thus, the verification code 324 can be any one or combination of the types described above, or any format that encodes information enabling verification of the cashier's check 300. As an alternative, the unique document verification code 324 could be positioned on a rear side of the check 300.

The bank that issued the cashier's check 300 has a system according to the invention that enables a user to input the verification code 324 to a user interface of a user device. Referring to FIG. 1, the bank operates the enterprise system 200 that can communicate with the user 110 through a user device (computing device 104 or mobile device 106). The enterprise system 200 includes the computing system 206 for remotely verifying a document such as the cashier's check 300 of FIG. 2.

The computing system 206 includes the storage device 224 that stores a plurality of valid verification codes, each of the valid verification codes corresponding to a valid document issued by the bank. The computing system further includes the communication interface 250, the a processor 220 operatively coupled with the storage device 224 and the communication interface 250, the processor adapted to be operatively coupled over the communication channel 258 with a user device (104, 106) by the communication interface, and an application 232 stored in the storage device 224 and including executable code that is executed by the processor 220 to perform automatic remote verification of a document such as the cashier's check 300.

FIG. 3 is a flow diagram representing a method, according to at least one embodiment, of creating and issuing the document 300 of FIG. 2 and storing the verification code 324. The method 400 begins with a step 402 of responding to a customer request for a cashier's check by creating the cashier's check 300 with the required information printed on the front side. The required information includes: the check number 302; the date 304; the payee name on the line 306; the amount in numerals 308; the amount in words 310; the payer identification 312; an authorized signature on the line 314; the magnetic ink character recognition (MICR) line 316, and the unique document verification code 324. In a step 404, the computing system 206 stores data that includes the verification code 324, the associated information displayed on the cashier's check 300, and optionally an image of the check. The check 300 is issued to the requesting customer in a step 406.

The computing system 206 also responds to the cashier's check 300 being processed for payment in a step 408. Completion of the payment process leads to a step 410 in which the data associated with the unique verification code 324 of the check 300 is updated to indicate that the check is no longer valid as a form of payment.

FIG. 4 is a flow diagram representing a method, according to at least one embodiment, of verifying the document 300 of FIG. 2. The method 500 begins at a step 502 when the user 110 logs into the computing system 206 from a user device (104, 106). The system 206 sends a prompt to the user device (104, 106) in a step 504 causing the user device to display a user instruction regarding initiating a verification of a document accessible to the user, the document 300 displaying the unique document verification code 324 on a front side of the document. The user responds to the user instruction in a step 506 by capturing, by a camera (146 in FIG. 1) of the user device in coordination with a downloaded application 132 stored on the user device, an electronic image of the front side of the document 300, the user device then transmitting the electronic image to the processing device 220 of the computing system 206 via the communication channel 258.

In a step 508, the computing system 206 receives the electronic image and operates the processor 220 to extract the document verification code 324 from the electronic image. In a step 510, the extracted verification code is compared to the verification codes stored in the storage device 224. If the extracted verification code matches one of the stored verification codes that is currently valid, the method 500 branches at YES to a step 512. In the step 512, the processor 220 transmits to the user device (104, 106) via the communication channel 258 a message indicating that the document is valid. In a step 514, the processor 220 optionally can transmit any or all information associated with the matching verification code including the image of the document 300.

If the extracted verification code does not match one of the verification codes stored in the storage device or the matching verification code is associated with a document that no longer is valid, the method 500 branches from the step 510 at NO to a step 516. In the step 516, the processor 220 transmits to the user device (104, 106) a message indicating that document is not valid. In a step 518, the processor 220 updates the data in the storage device 224 to indicate that an invalid document was submitted for verification.

As alternatives to submitting an electronic image of the front side of the document 300 in the step 506, the user 110 can enter the verification code via a keyboard or capture an image only of the verification code. The user computing device (104, 106) then generates code information representing the verification code that was entered via the keyboard and/or the camera and sends the code information to the processing device 220 of the computing system 206 in the step 506.

The above described computing system and method according to the invention provide an automated remote verification of a document, such as a cashier's check, at any time convenient to the user. The level of verification can range from a simple "valid" or "not valid" message to the complete information about the document, such as the name of who wrote the cashier's check (payer), the amount of the check, the date, and who is the payee.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A computing system for remotely verifying a document, the computing system comprising:

a storage device storing a plurality of unique document verification codes, each of the unique document verification codes corresponding to a different document, and the storage device storing data associated with each of the unique document verification codes;

a communication interface;

a processor operatively coupled with the storage device and the communication interface, the processor adapted to be operatively coupled over a communication channel with a user device by the communication interface; and an application stored in the storage device and including executable code that, when executed causes the processor to:

send a prompt to the user device over the communication channel causing the user device to display a user instruction regarding initiating a verification of a document accessible to the user, the document displaying a document verification code that was applied when the document was created;

wherein the user responds to the user instruction by inputting the document verification code from the user device in coordination with a downloaded application stored on the user device, the user device then transmitting the document verification code as code information to the processor via the communication channel;

receive the code information from the user device and compare the received document verification code to the unique document verification codes stored in the storage device; and transmit to the user device via the communication channel a message indicating that the document is valid when the received document verification code matches one of the unique document verification codes stored in the storage device or indicating that the document is not valid when the received document verification code does not match any of the unique document verification codes stored in the storage device.

2. The computing system according to claim 1 wherein the user responds to the user instruction by capturing, by a camera of the user device in coordination with a downloaded application stored on the user device, an electronic image of the document including the document verification code, the user device then transmitting the electronic image to the processor via the communication channel as the code information, the processor receiving the electronic image, extracting the document verification code from the electronic image and comparing the extracted document verification code to the unique document verification codes stored in the storage device.

3. The computing system according to claim 1 wherein the document is a cashier's check.

4. The computing system according to claim 3 wherein the cashier's check has a magnetic ink character recognition line and the document verification code is positioned adjacent a right end of the line.

5. The computing system according to claim 4 wherein the document verification code is formed in a same font as numbers in the magnetic ink character recognition line.

6. The computing system according to claim 1 wherein the document verification code is at least one of a number, an alphanumeric phrase, a bar code, a QR code, and a holographic image.

7. The computing system according to claim 1 wherein the data includes an image of the associated issued document.

8. The computing system according to claim 1 wherein the issued documents are cashier's checks and the data includes information displayed on a front side of each of the cashier's checks.

9. The computing system according to claim 1 wherein the processor transmits the message indicating that the document is not valid when the document verification code matches one of the unique document verification codes stored in the storage device and the document is no longer valid.

10. A method of remotely verifying a document, the method comprising steps of:

creating and issuing a document displaying a document verification code;

storing the document verification code in a storage device as one unique document verification code of a plurality of unique document verification codes;

displaying, by a user-interface of a user device, a prompt, wherein the prompt provides user instruction regarding initiating a verification of the document displaying the document verification code;

responding to the user instruction by entering the document verification code in the user device and/or by capturing, by a camera of the user device in coordination with a downloaded application stored on the user device, an electronic image of the document verification code on the document, wherein the downloaded application comprises computer-executable code that, when executed by a processor of the user device, provides the user-interface and responds to the entered document verification code and/or the electronic image to generate code information corresponding to the document verification code;

transmitting the code information to a computing system by operation of the user-interface and a communication circuitry of the user device;

receiving the code information by the computing system, the computing system extracting the document verification code from the code information and comparing the document verification code to the plurality of unique document verification codes stored in the storage device; and the computing system transmitting a message to the user device indicating that the document is valid when the extracted document verification code matches the one unique document verification code stored in the storage device or indicating that the document is not valid when the extracted document verification code does not match any of the unique document verification codes stored in the storage device.

11. The method according to claim 10 wherein the document verification code is at least one of a number, an alphanumeric phrase, a bar code, a QR code, and a holographic image.

12. The method according to claim 10 wherein the document is a cashier's check and including updating data in the storage device to indicate that the cashier's check is not valid when the cashier's check has been processed for payment.

13. The method according to claim 10 including transmitting the message that the document is not valid when the extracted document verification code matches one of the unique document verification codes stored in the storage device and the associated issued document is no longer valid.

14. A method of remotely verifying a document, the method comprising steps of:

creating a document;

placing a document verification code on the document;

storing the document verification code as a unique document verification code in a storage device;

issuing the document with the document verification code;

receiving a document verification code from a user device;

comparing the received document verification code with the unique document verification code stored in the storage device; and transmitting a message to the user device indicating that the received document verification code is associated with a valid document when the received document verification code matches the unique document verification code stored in the storage device, indicating that the received document verification code is not associated with a valid document when the received document verification code does not match the unique document verification code stored in the storage device, and indicating that the document is not valid when the received document verification code matches the unique document verification code stored in the storage device and the document is no longer valid.

15. The method according to claim 14 wherein the unique document verification code is at least one of a number, an alphanumeric phrase, a bar code, a QR code, and a holographic image.

16. The method according to claim 14 wherein the document is a cashier's check and including updating data in the storage device to indicate that the cashier's check is not valid when the cashier's check has been processed for payment.

* * * * *